United States Patent [19]

Christopher, Jr. et al.

[11] Patent Number: 5,335,332
[45] Date of Patent: Aug. 2, 1994

[54] METHOD AND SYSTEM FOR STACK MEMORY ALIGNMENT UTILIZING RECURSION

[75] Inventors: Kenneth W. Christopher, Jr., Lighthouse Point; Virginia M. Roarabaugh, Boca Raton; Theodore C. Waldron, III, Sunrise, all of Fla.

[73] Assignee: International Business Machines Corporation, Armonk, N.Y.

[21] Appl. No.: 815,103

[22] Filed: Dec. 24, 1991

[51] Int. Cl.$^5$ ............................................ G06F 13/00
[52] U.S. Cl. ..................................... 364/400; 395/425
[58] Field of Search ............................... 395/400, 425

[56] References Cited

U.S. PATENT DOCUMENTS

| | | | |
|---|---|---|---|
| 3,824,561 | 7/1974 | Wolf | 395/250 |
| 4,330,822 | 5/1982 | Dodson | 395/600 |
| 4,435,753 | 3/1984 | Rizzi | 395/700 |
| 4,860,197 | 8/1989 | Langendorf et al. | 395/375 |
| 4,920,483 | 4/1990 | Pogue et al. | 395/425 |
| 4,933,847 | 6/1990 | Chau et al. | 395/375 |
| 4,992,931 | 2/1991 | Hirasawa | 395/500 |
| 5,021,974 | 6/1991 | Pisculli et al. | 395/151 |
| 5,023,828 | 6/1991 | Grundmann et al. | 395/375 |

*Primary Examiner*—David L. Robertson
*Attorney, Agent, or Firm*—Joseph P. Abate; Andrew J. Dillon

[57] ABSTRACT

A method and system for enhancing operating system efficiency in a data processing system by ensuring alignment of stack memory at a multi-byte boundary such that multi-byte data fetch operations may be utilized to efficiently retrieve data from the stack memory. At each invocation of an operating system procedure from an application within a data processing system, a stack memory pointer is examined to determine if stack memory contents including passed parameters and local variables to be allocated onto the stack memory will be aligned at a multi-byte boundary. In response to a prospective nonalignment of local variables, the operating system procedure is recursively invoked with an additional "dummy" parameter, such that stack memory contents will be aligned at a multi-byte boundary. Thereafter, the operating system will automatically align data within the stack memory at a multi-byte boundary so that the data may be efficiently stored and retrieved utilizing multi-byte data operations.

9 Claims, 3 Drawing Sheets

METHOD AND SYSTEM FOR STACK MEMORY ALIGNMENT UTILIZING RECURSION

BACKGROUND OF THE INVENTION

1. Technical Field:

The present invention relates in general to enhanced efficiency in data processing systems and in particular to enhanced efficiency in operating systems within data processing systems. Still more particularly, the present invention relates to a method of enhancing operating system efficiency in a data processing system by ensuring that data placed in temporary storage within a stack memory is aligned at a multi-byte boundary so that data may be efficiently retrieved or stored utilizing multi-byte data operations.

2. Description of the Related Art:

Modern data processing systems often utilize one or more so-called "stack" memories as temporary storage for return addresses, application parameters, local variables and other data which may be utilized during a data processing procedure. Stack memories are utilized in a Last-In, First-Out (LIFO) manner, and may be referenced either explicitly or implicitly by operating system procedures. Typically, an application within a data processing system places any required parameters within the stack memory, invoking an operating system procedure and which stores a return address therein. Next, local variables defined by specific work routines within the operating system procedure are allocated ont the stack memory. Thereafter, data required by the operating system procedure may be placed on the stack and retrieved during selected operations.

Data placed within a stack memory in a state-of-the-art data processing system is generally retrieved (fetched) utilizing multi-byte data fetch operations. Specifically, modern microprocessors often utilize four eight bit bytes of data for each fetch operations, or a so-called "double-word" fetch. Alternatively, selected microprocessors utilize two eight bit bytes of data, or a "single-word" fetch. Similarly, modern processors also store data within memory utilizing a multi-byte operation.

Thus, those skilled in the art will appreciate that a single eight bit byte of data may always be retrieved from memory with a multi-byte data fetch, ignoring the unrequired data. However, when two consecutive eight bit bytes of data are required, it is not always possible to retrieve the required two consecutive eight bit bytes of data with a single multi-byte data fetch, due to possible misalignment. As a consequence, the utilization of stack memory is preferably constrained to multi-byte boundary alignments when possible, to avoid a degradation of processor performance which results from misalignment.

In situations in which a stack memory is continually under the control of an operating system, alignment of data at multi-byte boundaries is easily accomplished utilizing existing alignment procedures. However, an operating system is preferably designed to be "called" or invoked by applications which operate within the data processing system. Once invoked, the operating system procedures will perform selected functions and thereafter return to the calling application. This dichotomy of operation results in selected aspects of the operating system environment which are not completely under the control of the operating system.

At a minimum, operating system procedures, once called, must execute instructions to obtain control over the environment. The extent to which the environment is modified will vary based upon which operating procedure has been called. For simple functions, such as returning the operating system version or release identifier, there may be no change made to the environment. For more complex functions, such as initiating another application, the operating system may choose to completely encapsulate itself while executing the request.

One aspect of the environment which is not under the control of the operating system is the status of the stack memory, which is inherited from the application which invokes the operating system procedure. There are at least two significant aspects of the stack memory status which are important to an operating system. Specifically, the amount of stack memory space which is presently available and the address alignment of the current stack pointer. The procedure within the operating system which is invoked must utilize the stack memory. At a minimum, the operating system procedure will be required to obtain the calling application's return address from the stack memory.

Typically, the operating system procedure may also make calls to its own subroutines, thereby storing more return addresses on the stack. If parameters are to be passed to the interface, then the operating system procedure code will necessarily obtain those parameters from the stack memory. Finally, the code which executes to support the interface may define local variables which are allocated onto the stack.

Unless the operating system procedure switches to a different stack memory space which is continually under the control of the operating system, the operating system procedure will execute with the inherited alignment characteristics of the stack memory provided by the calling application. Experimentation has shown that a misalignment within a stack memory wherein local variables are initially placed on the stack at other than a multi-byte boundary may result in a degradation in processor performance of twice the amount of time normally utilized for a particular transaction.

It should therefore be apparent that a need exists for a method and system whereby stack memory alignment in a data processing system may be efficiently constrained to multi-byte boundaries, such that data placed within the stack memory by the operating system procedure may be efficiently retrieved and stored utilizing multi-byte data operations.

SUMMARY OF THE INVENTION

It is therefore one object of the present invention to provide an improved data processing system.

It is another object of the present invention to provide a method and system for enhancing the efficiency of operating systems within a data processing system.

It is yet another object of the present invention to provide a method and system for enhancing operating system efficiency in a data processing system by ensuring that data placed within temporary storage within a stack memory is aligned at a multi-byte boundary so that the data may be efficiently retrieved utilizing multi-byte data fetch operations.

The foregoing objects are achieved as is now described. A method and system for enhancing operating system efficiency in a data processing system by ensuring alignment of stack memory at a multi-byte boundary such that multi-byte data fetch operations may be utilized to efficiently retrieve data from the stack memory. At each invocation of an operating system procedure from an application within a data processing system, a stack memory pointer is examined to determine if stack memory contents including passed parameters and local variables to be allocated onto the stack memory will be aligned at a multi-byte boundary. In response to a prospective nonalignment of local variables, the operating system procedure is recursively invoked with an additional "dummy" parameter, such that stack memory contents will be aligned at a multi-byte boundary. Thereafter, the operating system will automatically align data within the stack memory at a multi-byte boundary so that the data may be efficiently stored and retrieved utilizing multi-byte data operations.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
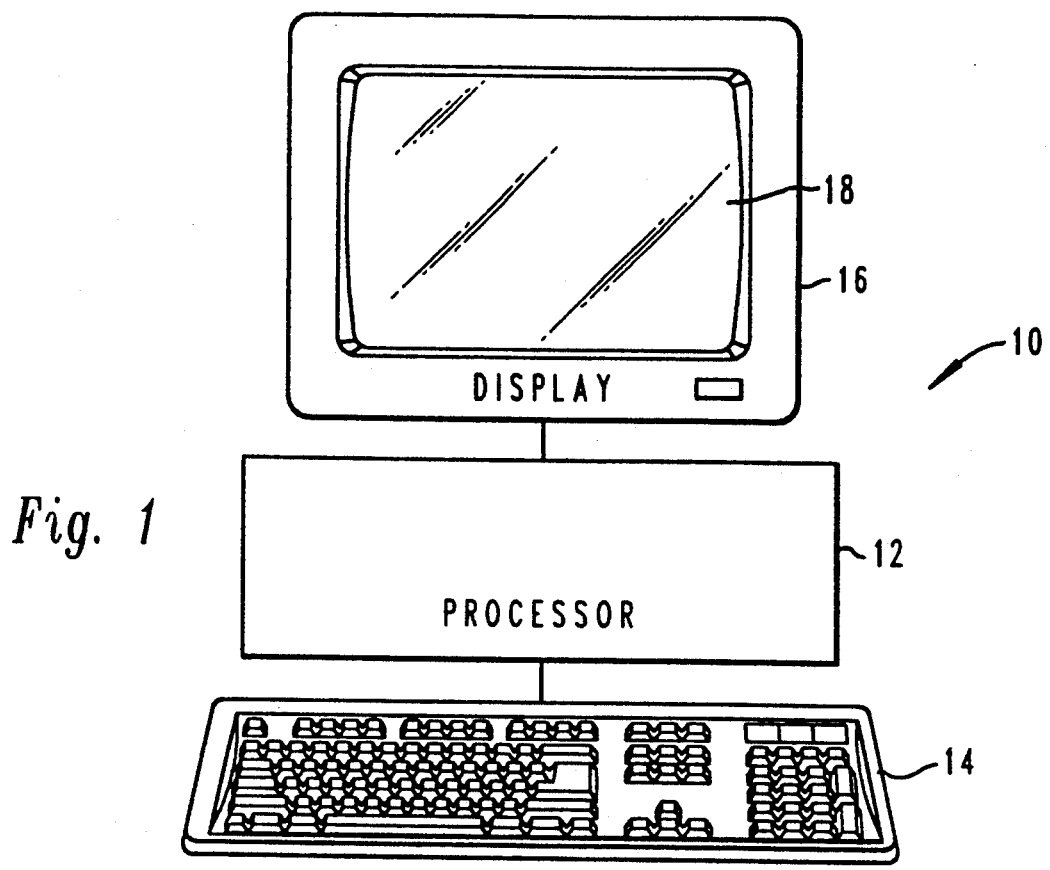
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As is typical in so-called "personal" computers, data processing system 10 includes a processor 12 coupled to a keyboard 14 and display 16. Display 16 preferably includes a display screen 18 and processor 12 will incorporate a state-of-the-art central processing unit. Those skilled in the art will appreciate that data processing system 10 may be implemented utilizing any suitable "personal" computer, such as the International Business Machines Corporation PS/2 computer.

Figure 2:
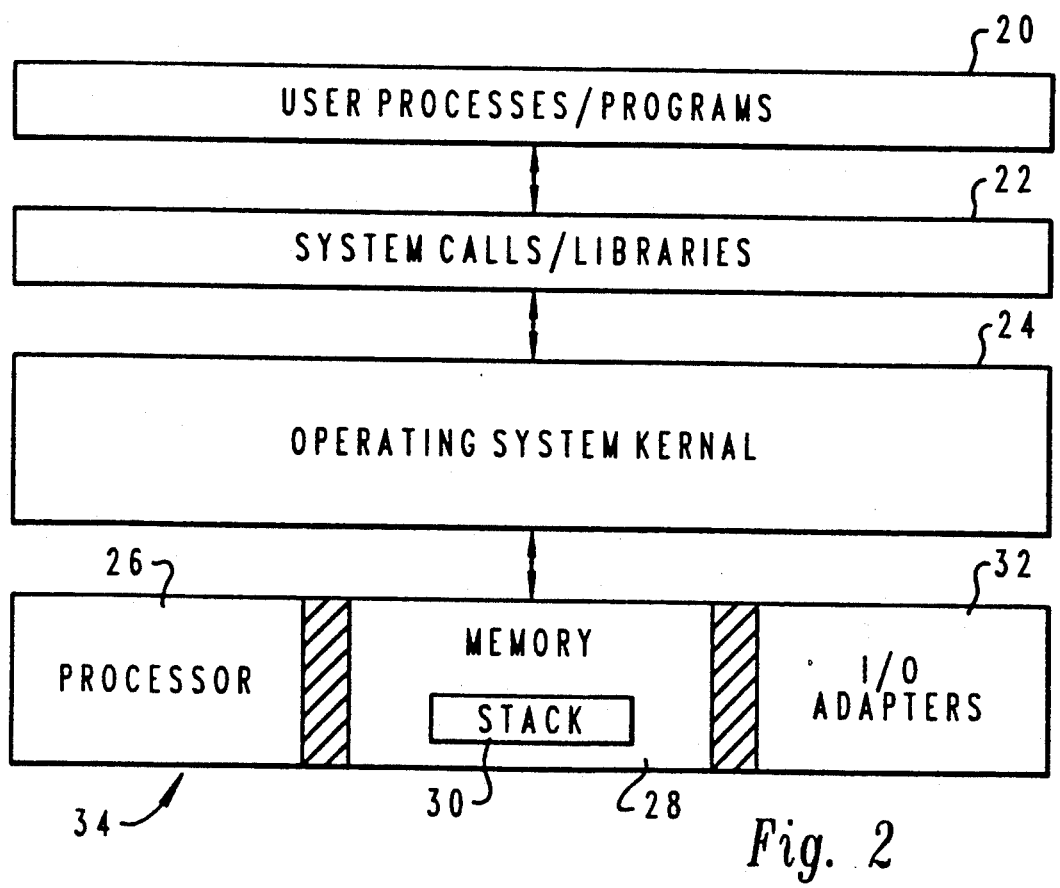
FIG. 2 is a high level block diagram of software and hardware elements of the data processing system of FIG. 1 which may be utilized to illustrate the method and system of the present invention.

Referring now to FIG. 2, there is depicted a high level block diagram of software and hardware elements of data processing system 10 of FIG. 1, which may be utilized to illustrate the method and system of the present invention. Depicted within the box at reference numeral 20 are user processes/programs which are applications which may be utilized within data processing system 10. Such processes and/or programs are designed to operate with an operating system and communicate with the operating system by means of the software elements referred to at reference numeral 22, including various system calls and/or libraries. Applications or programs selected by the user then interface with the operating system kernel, depicted at reference numeral 24, by means of the system call interface at 22. Those skilled in the art will appreciate that operating system kernel 24 preferably includes various subsystems, such as process/task management, memory management, file systems, input/output services, device drivers, a scheduler, interrupt manager, etc.

An interface is depicted between operating system kernel 24 and hardware elements 34. As depicted within FIG. 1, hardware elements 34 of data processing system 10 preferably include a processor 26, memory 28 and input/output adapters 32. Input/output adapters 32 are preferably utilized to control various peripheral devices such as disk storage devices. Also depicted within memory 28 is a subsection of memory 28 labeled stack 30. Those skilled in the art will appreciate that modern state-of-the-art data processing systems often utilize a so-called "stack" memory for temporary storage of parameters, variables, return addresses and the like which are utilized by the system during operation of a particular operating system procedure. Additionally, data processing systems often utilize multiple stacks, one or more for each program/process/thread that is active in the system.

As is typical in such systems, an invocation of an operating system procedure by a user process or program will utilize stack memory 30 by first placing various parameters from the user process or program within stack memory 30. Next, a return address to which the operating system will return upon completion of the invoked procedure is placed within the stack. Thereafter, local variables are allocated to stack memory 30 by the operating system procedure, as required. During operation of the operating system procedure various subroutine return addresses and calls are also stored within stack memory 30 and the operating system procedure will typically utilize stack memory 30 in a Last-In, First-Out manner, until completion of the procedure and a return to the return address first stored within stack memory 30.

One problem which exists in such operations is due to the fact that modern processors retrieve data from memory, including stack memory, in a multi-byte retrieval or "fetch." That is, modern processors generally retrieve data from memory in increments of four eight bit bytes or two eight bit bytes in what is generally referred to as a double-word fetch or a single-word fetch. Additionally, modern processors also store data into memory, including stack memory, in a similar multi-byte operation. Thus, those skilled in the art will appreciate that after loading various parameters into stack memory 30 and then invoking an operating system procedure, the local variables placed within stack memory 30 by the operating system procedure may or may not be aligned at a multi-byte boundary within stack memory 30. This possible misalignment can result in a substantial degradation in processor performance due to the fact that multiple multi-byte data fetches may be required to retrieve data which might otherwise be accessed by a single multi-byte operation.

Figure 3A:
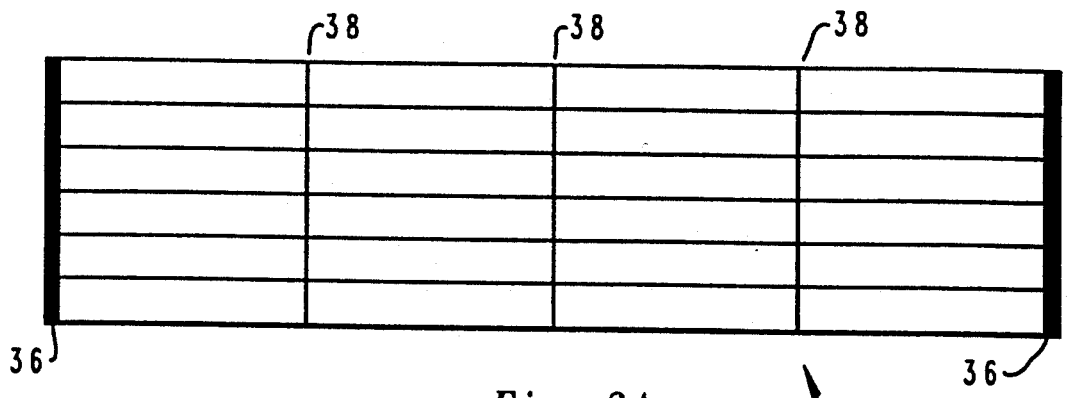
FIGS. 3a-3c are schematic pictorial representations of a section of stack memory, illustrating multi-byte boundaries along which alignment is desired to enhance operating system efficiency.

This problem and the method and system of the present invention for solving this problem are illustrated with reference to FIGS. 3a-3c, which depict schematic pictorial representations of a section of stack memory 30, illustrating multi-byte boundaries along which alignment is desired for enhancement of operating system efficiency. As depicted in FIG. 3a, a schematic representation of a portion of stack memory 30 is illustrated.

Stack memory 30 is depicted within FIG. 3a as including two multi-byte boundaries 36, which serve as delimiters for four eight bit bytes of memory which are disposed therebetween. Of course, it will be apparent to those skilled in the art upon reference to the foregoing that the present invention has equal application in data processing systems which utilize stack memory which is divided along two eight bit byte boundaries, in a so-called single-word data fetch system. Also depicted within FIG. 3a are byte boundaries 38, which serve to mark the boundaries between adjacent eight bit bytes of data.

Figure 3B:
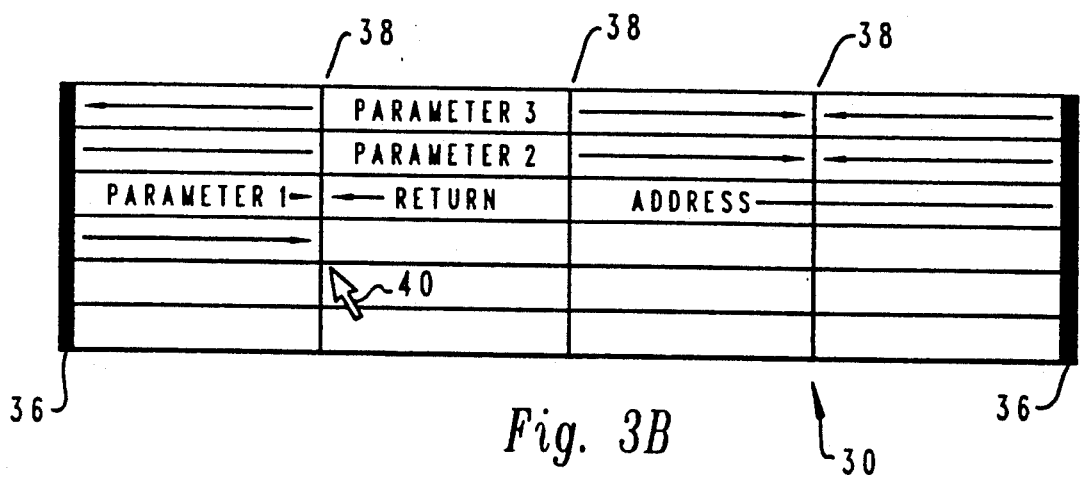

Referring now to FIG. 3b, an illustration of the invocation of an operating system procedure by an application within data processing system 10 is depicted. For purposes of illustration, it will be assumed that stack memory 30 is completely empty; however, generally data is present within stack memory 30. For purposes of explanation it will be assumed that the return address for the application (not shown) invoking the operating system procedure has already been stored within stack memory 30 and a three byte parameter "Parameter 3" is then stored within the first three bytes of memory within stack memory 30. Next, a four byte parameter, "Parameter 2" is stored within the next four bytes of memory within stack memory 30. Finally, a two byte parameter "Parameter 1" is stored within stack memory 30.

Thereafter, a four byte return address is stored within stack memory 30, ending at a byte boundary 38, as indicated at stack address pointer 40.

Thus, it should be apparent to those skilled in the art that the allocation of local variables onto stack memory 30 by the operating system procedure will result in all data thereafter loaded within stack memory 30 being misaligned. That is, not aligned along a multi-byte boundary.

Figure 3C:
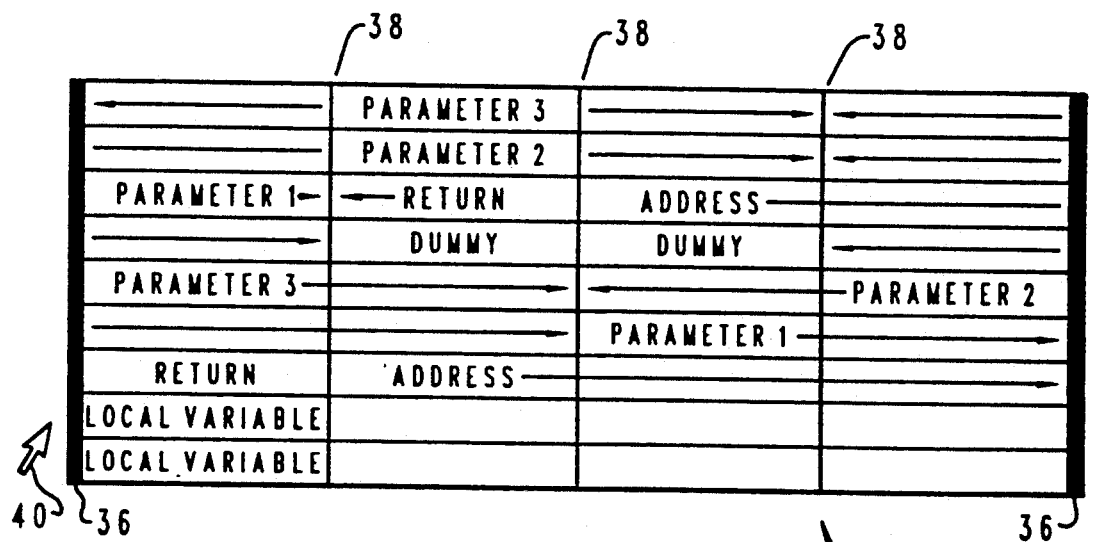

Next, referring to FIG. 3c, an important feature of the present invention will be disclosed. It might seem that it would be possible to ensure alignment of local variables from the operating system procedure along a multi-byte boundary by merely padding stack memory 30 with additional dummy variables until a multi-byte boundary has been reached. However, the location of various parameters within stack memory 30 is generally set forth in terms of an offset from the return address and the inclusion of padding as suggested above will invalidate the addresses of each parameter stored within stack memory 30.

Therefore, in accordance with the method and system of the present invention, the operating system procedure invoked is recursively invoked a second time, while passing an additional dummy parameter during that process. The length of the dummy parameter in bytes is calculated by an examination of the modulo of the address pointer within stack memory 30, and calculated to ensure that address pointer 40 within stack memory 30 will be located at a multi-byte boundary upon completion of the loading of application parameters.

Thus, as depicted within FIG. 3c, a two byte dummy parameter has been included in the recursive invocation of the operating system procedure and thereafter the three parameters "Parameter 3," "Parameter 2," and "Parameter 1" are allocated onto stack memory 30, ending at a multi-byte boundary. As illustrated in FIG. 3c, local variables may thereafter be allocated onto stack memory 30 at a multi-byte boundary, as indicated at stack pointer 40. Those skilled in the art will appreciate that having placed stack memory 30 under the control of the operating system procedure, the alignment of data therein may thereafter be automatically accomplished by placing each new section of data stored within stack memory 30 at a multi-byte boundary in the manner depicted herein.

Figure 4:
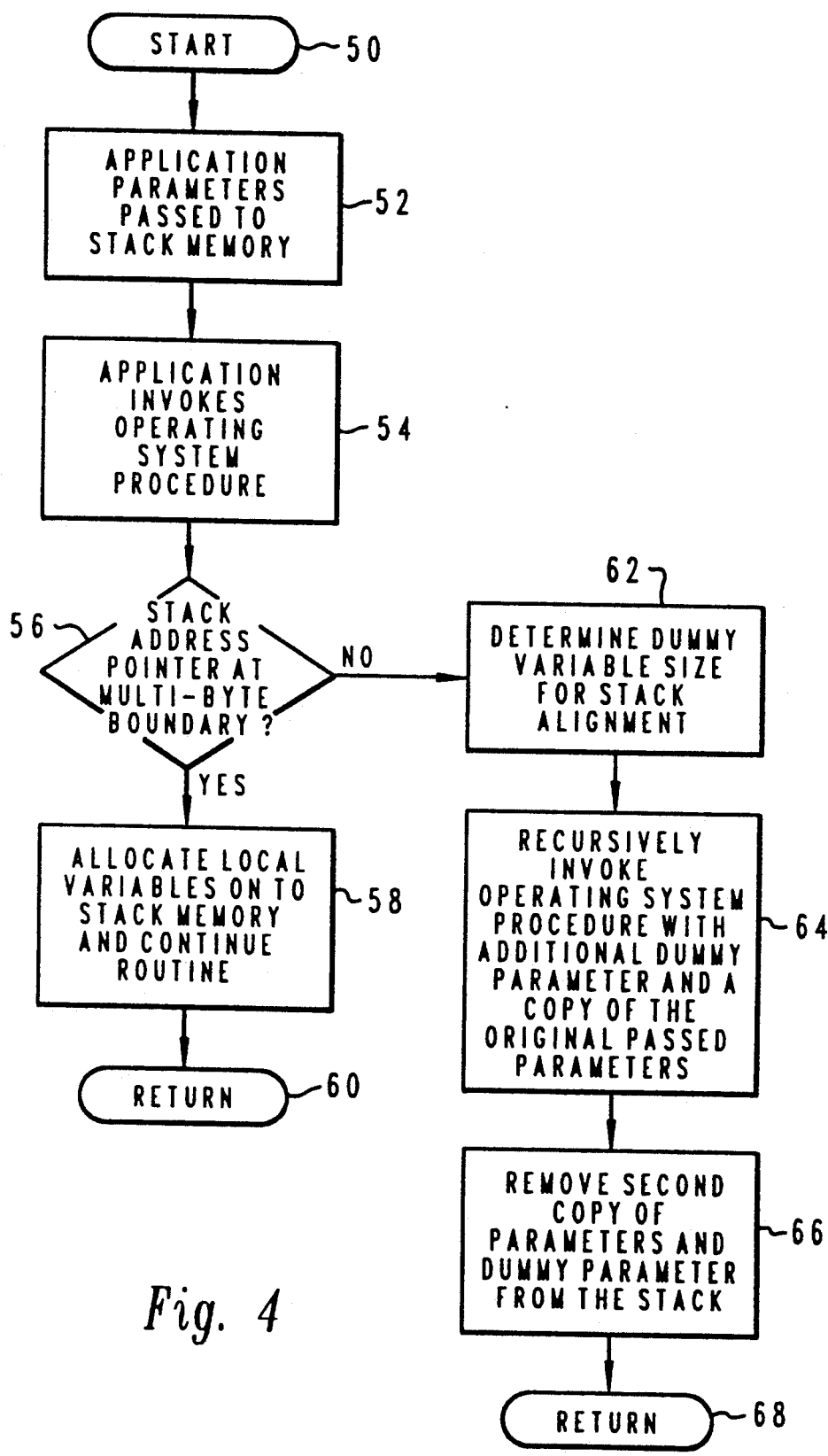
FIG. 4 is a high level logic flowchart illustrating a software implementation of the method and system of the present invention.

With reference now to FIG. 4, there is depicted a high level flowchart implementing a software implementation of the method and system of the present invention. As depicted, the process begins at block 50 and thereafter passes to block 52. Block 52 illustrates application parameters being passed to the stack memory. Next, as illustrated at block 54, the operating system procedure is invoked by an application or program within the data processing system.

Thereafter, the process passes to block 56 which depicts a determination of whether or not the stack address pointer within the stack memory is pointing to a multi-byte boundary. If so, the process merely passes to block 58 which illustrates the allocation of local variables from the operating system procedure onto the stack memory and the execution of that procedure. The process then returns, as depicted at block 60.

Referring again to block 56, in the event the stack address pointer within the stack memory does not point to a multi-byte boundary, the process passes to block 62. Block 62 illustrates a determination of the size of a dummy variable which must be included in a recursive call of the operating system procedure in order to ensure that the stack address pointer will be aligned at a multi-byte boundary after the recursion. Thereafter, block 64 depicts the recursive invocation of the operating system procedure, with the additional dummy parameter. Upon return from this second invocation, the second copy of the parameters is removed from the stack, along with the dummy parameter, as illustrated at block 66. Thereafter, the operating system procedure returns to the application program, as depicted in block 68.

Upon reference to the foregoing those skilled in the art will appreciate that the Applicants herein have created a simple and efficient method and system whereby data within a stack memory utilized by an operating system procedure which has been invoked by an application within a data processing system may be constrained to an initial address location along a multi-byte boundary, such that data retrieval from the stack memory may be efficiently performed utilizing multi-byte data fetch operations. By recursively invoking the operation and passing dummy parameters with that invocation, the address offset of each parameter within the stack memory from the local variables is maintained and operating system efficiency is greatly enhanced.

While the invention has been particularly shown and described with reference to a preferred embodiment, it will be understood by those skilled in the art that various changes in form and detail may be made therein without departing from the spirit and scope of the invention.

We claim:

1. A method for enhancing operating system efficiency in a data processing system utilizing multi-byte data fetch operations and having a stack memory for temporary storage, said method comprising the steps of:

at each invocation of a procedure within said operating system from an application within said data processing system, determining if stack memory contents including passed parameters and variables from said procedure will be aligned at a multi-byte boundary within said stack memory; and if said stack memory contents are not aligned at a multi-byte boundary within said stack memory, recursively invoking said procedure with an additional parameter such stack memory contents allocated on said stack memory with said additional parameter are aligned at a multi-byte boundary within said stack memory wherein data may be efficiently stored and retrieved thereafter within said stack memory utilizing multi-byte data operations.

2. The method for enhancing operating system efficiency in a data processing system according to claim 1, wherein each of said multi-byte data operations comprises a four byte double-word data operation.

3. The method for enhancing operating system efficiency in a data processing system according to claim 1, wherein each of said multi-byte data operations comprises a two byte single-word data operation.

4. The method for enhancing operating system efficiency in a data processing system according to claim 2, further including the step of automatically aligning data placed within said stack memory by said procedure on four byte double-word boundaries after said recursive invocation..

5. The method for enhancing operating system efficiency in a data processing system according to claim 1, wherein said step of the determining if stack memory contents including passed parameters and variables from said procedure will be aligned at a multi-byte boundary within said stack memory comprises the step of determining an address for a current stack pointer.

6. A data processing system for enhancing operating system efficiency, said data processing system comprising:

a stack memory for temporary storage of data;

means for performing multi-byte data fetch operations from said stack memory;

means for determining if stack memory contents including passed parameters and local variables from an operating system procedure invoked by an application within said data processing system will be aligned at a multi-byte boundary within said stack memory; and means for recursively invoking said operating system procedure with an additional parameter in response to a prospective nonalignment of said local variables, such that said stack memory contents will be aligned at a multi-byte boundary within said stack memory wherein data may be efficiently stored and retrieved thereafter within said stack memory utilizing said means for performing multi-byte data operations.

7. The data processing system for enhancing operating system efficiency according to claim 6, wherein said means for performing multi-byte data operations from said stack memory comprises means for performing four-byte double-word data operations.

8. The data processing system for enhancing operating system efficiency according to claim 6, wherein said means for performing multi-byte data operations from said stack memory comprises means for performing two-byte single-word data operations.

9. The data processing system for enhancing operating system efficiency according to claim 6, further including means for automatically aligning data placed within said stack memory by said operating system procedure on a multi-byte boundary after said recursive invocation of said operating system procedure.

* * * * *